United States Patent
Hill (10) Patent No.: US 10,363,812 B2
(45) Date of Patent: Jul. 30, 2019

(54) VAPOUR RECOVERY SYSTEM AND VAPOUR CONTROL METHOD

(71) Applicant: Plastic Omnium Advanced Innovation and Research, Brussels (BE)

(72) Inventor: David Hill, Commerce Township, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 15/540,790

(22) PCT Filed: Jan. 14, 2016

(86) PCT No.: PCT/EP2016/050658
§ 371 (c)(1),
(2) Date: Jun. 29, 2017

(87) PCT Pub. No.: WO2016/116348
PCT Pub. Date: Jul. 28, 2016

(65) Prior Publication Data
US 2018/0022211 A1      Jan. 25, 2018

Related U.S. Application Data

(60) Provisional application No. 62/107,064, filed on Jan. 23, 2015.

(30) Foreign Application Priority Data

Mar. 17, 2015   (EP) ..................... 15159309

(51) Int. Cl.
*B60K 15/035*    (2006.01)
*B60K 15/06*     (2006.01)
*B60K 15/03*     (2006.01)

(52) U.S. Cl.
CPC .. *B60K 15/03504* (2013.01); *B60K 15/03519* (2013.01); *B60K 15/061* (2013.01);
(Continued)

(58) Field of Classification Search
CPC ........ B60K 15/03504; B60K 15/03509; B60K 15/03519; B60K 2015/03514; B60K 2015/03566; B60K 2015/03576
(Continued)

(56) References Cited

U.S. PATENT DOCUMENTS 6,220,230 B1 * 4/2001 Kawamura ........ F02M 25/0809
                                                   123/520
6,253,802 B1    7/2001 Enge
(Continued)

FOREIGN PATENT DOCUMENTS

CN    101871408 A    10/2010
CN    104010908 A    8/2014
(Continued)

OTHER PUBLICATIONS

International Search Report dated Apr. 6, 2016 in PCT/EP2016/050658 filed Jan. 14, 2016.
(Continued)

*Primary Examiner* — Erick R Solis
(74) *Attorney, Agent, or Firm* — Oblon, McClelland, Maier & Neustadt, L.L.P.

(57) ABSTRACT

A vapour recovery system recovers vapour coming from a vehicle tank. The system includes a valve that is positionable in a closed position, an open position creating a passageway with a first size, and one or more intermediate positions each creating a passageway with a size smaller than the first size. The system also includes an electronic controller to control an actuator to position the valve in a sequence of positions over time. The sequence includes at least one of the inter-
(Continued)

mediate positions during a time period larger than 1 second. The valve is arranged in a line of the vapour recovery system between a vapour outlet of the vehicle tank and the atmosphere. The actuator is a stepper-motor based linear actuator. The controlling includes selecting at least one intermediate position, and the selection includes selecting a number of steps to be set from a predetermined reference position.

19 Claims, 6 Drawing Sheets

(52) U.S. Cl.
CPC ............... *B60K 2015/0348* (2013.01); *B60K 2015/03217* (2013.01); *B60K 2015/03236* (2013.01); *B60K 2015/03256* (2013.01); *B60K 2015/03514* (2013.01); *B60K 2015/03566* (2013.01); *B60K 2015/03576* (2013.01)

(58) Field of Classification Search
USPC .................................................. 123/519, 520
See application file for complete search history.

(56) References Cited

U.S. PATENT DOCUMENTS

| | | | |
|---|---|---|---|
| 8,019,525 B2* | 9/2011 | DeBastos | B60K 15/03504 123/520 |
| 9,803,593 B2* | 10/2017 | Kimoto | F16K 31/04 |
| 2001/0025668 A1 | 10/2001 | Enge | |
| 2011/0168931 A1* | 7/2011 | Sugiura | F16K 1/443 251/129.15 |
| 2012/0111307 A1 | 5/2012 | Hagen | |
| 2012/0168454 A1 | 7/2012 | Hagen | |
| 2017/0292477 A1* | 10/2017 | Kimoto | F02M 37/00 |

FOREIGN PATENT DOCUMENTS

| | | |
|---|---|---|
| DE | 102010054960 A1 | 6/2012 |
| EP | 1055541 A2 | 11/2000 |
| WO | 2014/207083 A2 | 12/2014 |

OTHER PUBLICATIONS

European Search Report dated Aug. 25, 2015 in EP15159309.2 filed Mar. 17, 2015.

* cited by examiner

VAPOUR RECOVERY SYSTEM AND VAPOUR CONTROL METHOD

TECHNICAL FIELD

Embodiments of the invention relate to the field of vehicle storage systems with vapour control, and to vapour control methods. More generally, the invention relates to the field of conventional vehicles and hybrid vehicles.

BACKGROUND

Due to increased emission standards, nowadays vehicles typically include a fuel vapour recovery system. Such a fuel vapour recovery system includes a canister for receiving fuel vapours generated in the fuel tank. A fuel vapour absorbent material located in the canister retains the fuel vapour when displaced from the fuel tank, e.g. during refueling. During operation of the engine, the fuel vapour contained in the canister may be purged by drawing fresh air through the canister. In fuel vapour recovery systems of the prior art, typically there is provided a vapour vent valve between the tank and an inlet of the canister for being capable of blocking the entrance of vapour from the fuel tank in the canister. Further, there may be provided a canister vent valve between an air vent and an outlet of the canister. For example, during filling or at elevated temperatures, the vapour vent valve and the canister vent valve are open, so that a fuel vapour can flow from the fuel tank into the canister, and fresh air can flow out in the atmosphere through the canister vent valve, allowing the pressure in the fuel tank to be reduced. During normal engine operation, the vapour vent valve may be closed while the canister vent valve is open to allow the flow of air into the outlet of the canister, through the canister medium and through a canister purge valve allowing the fuel vapour stored in the canister to be delivered to the engine.

In such prior art systems it is difficult to control the amount of vapours that is being removed from the tank during refueling and/or during purging. Prior art systems may be pressure-based, wherein the refueling is controlled on the basis of pressure measurements. However, if the pressure sensor fails, a good refueling cannot be obtained. Further, prior art systems are difficult to calibrate in view of hard tooling requirements. Generally speaking the usable volume of a fuel tank can only be predicted to an accuracy of around 10% before actual tanks are produced. Since the associated float valves that typically control the shutoff have a similar lead time to construct as the tank, they are generally made based on a prediction of what the fluid height in the tank would be at the rated capacity. Since this fluid height often varies, a certain amount of physical adjustment to the shutoff height of the valves is required. Since these are hard tooled components, it often means making small modifications to the injection moulds and re-running parts. This is a process that can take as much as several weeks to carry out. In addition the valves are usually fusion welded to the tank shell and therefore new prototype tanks must be allocated to allow for welding the modified valves to.

SUMMARY

The object of embodiments of the invention is to provide a vapour recovery system and method with improved vapour control. Another object of exemplary embodiments is to allow for a calibratable vapour control. An object of further developed embodiments is to eliminate the need for pressure sensor feedback for controlling the vent valve of a vapour recovery system and/or to refine the ability to control the vapour flow from the tank based on various vehicle status parameters.

According to an aspect of the invention there is provided a vapour recovery system, typically a fuel vapour recovery system, for recovering vapour from a vehicle tank, comprising a valve, an actuator and a controller. The valve is configured for being positionable in a closed position, an open position creating a passageway with a first size, and one or more intermediate positions each creating a passageway with a size which is smaller than said first size. The valve is further configured for regulating a vapour flow of the vapour recovery system. The actuator is configured for operating the valve. The controller is configured for controlling said actuator to position said valve in a sequence of positions over time, wherein said sequence comprises at least one of said one or more intermediate positions during a time period, said time period being larger than 1 second. The valve is arranged in a line between a vapour outlet of a vehicle tank and the atmosphere.

By creating one or more intermediate positions for the valve, the amount of vapour flowing through the valve can be controlled in an improved manner by the controller, e.g. based on a number of vehicle status parameters. By having one or more intermediate positions instead of only an open and closed position, the control of the vapour flow may be refined.

The sequence comprises at least one of said one or more intermediate positions during the time period which is larger than 1 second. This implies that this time period may consist of only one fixed intermediate position, or of a series of different intermediate positions. Or, stated differently, during said time period, the valve is not in the closed position and not in the open position.

In preferred embodiments the time period is larger than 2 seconds, more preferably larger than 5 seconds. In vehicle vapour recovery systems such time periods will allow for a reliable control of the vapour flow. Such time periods are substantially longer that valve closure times of prior art valves.

In exemplary embodiments the valve may be positioned in one fixed intermediate position during the entire time period. In other exemplary embodiments the valve may be moved gradually through a series of different intermediate positions during the time period.

According to a preferred embodiment the controller is an electronic controller configured to control the positioning of the valve based on vehicle status parameters. Vehicle status parameters may include any one or more of the following: liquid level in the vehicle tank, temperature in the vehicle tank, pressure in the vehicle tank, hydrocarbon content in the vehicle tank, the position of a fuel cap (closed/open), pressure of liquid fuel in a line between the vehicle tank and the engine, canister load. In a preferred embodiment the valve is configured to be positioned in a plurality of intermediate positions, and the controller is configured to select at least one intermediate position of said plurality of intermediate positions in function of at least one vehicle status parameter, and to include said selected at least one intermediate position in said sequence during the time period. In that way calibration of the vapour control becomes possible.

In preferred embodiments the controller is configured for controlling the actuator to position said valve in the sequence of positions during refueling of the vehicle tank. In that way refueling may be controlled in a refined manner. In an exemplary embodiment the sequence of positions comprises the open position during a first period of a refueling event; then the at least one intermediate position during a second period corresponding with said time period, and at the end of the refueling event the closed position. The system may then further comprise a level sensor for detecting a level of the liquid, typically fuel, in the vehicle tank; and the controller may then be configured for determining the at least one intermediate position and/or the beginning of the second period based on the detected level. E.g. when the controller determines that the sensed level is above a predetermined threshold, it may be decided to move the valve from the open position to an intermediate position immediately or shortly after having detected that the sensed level is above the threshold.

In such embodiments the partial opening of the valve, i.e. the one or more intermediate positions, allows mimicking the refueling behaviour of a traditional mechanical venting system at shutoff and allows calibration of the shutoff characteristics without hard tooling. A further advantage of such embodiments is that pressure monitoring is unnecessary, meaning an easier integration into a customer's system and one less failure mode from a Failure Mode and Effects Analysis (FMEA) standpoint.

In preferred embodiments the controller is configured for determining that the refueling event is to be initiated upon detecting any one or more of the following: an input of a button operable by an operator, opening of a fuel door of the vehicle, shut-off of the vehicle, vehicle in the park position.

In preferred embodiments the actuator is a stepper motor based linear actuator. Such an actuator will allow for a reliable positioning of the valve. Compared to solenoids, solenoids have the drawback of having a high current draw to hold an intermediate position.

In an exemplary embodiment the valve is arranged in a line between a vapour outlet of a vehicle tank and a vapour filter unit, preferably a canister, more preferably a carbon canister. The controller may be further configured for controlling the actuator to position the valve in the sequence of positions during purging of the vapour filter unit.

To partially open the tank to canister communication in a purging mode, allows for venting pressure from the tank, and for better controlling the consistency of vapour loading going to the engine during a purge.

In an exemplary embodiment the system further comprises a measurement means for measuring or inferring a vapour load of the filter unit, and the controller is configured for determining said at least one intermediate position and/or a begin time of the time period and/or the length of the time period in function of the measured or inferred vapour load during purging of the vapour filter unit. E.g. the controller may decide to position the valve in an intermediate position if it is determined that the vapour load of the canister is below a predetermined threshold.

In an exemplary embodiment the vapour recovery system comprises a vehicle tank, a vapour filter unit, and a housing forming a valve module including the valve, and optionally also the controller.

The vehicle tank has a vapour outlet. The vapour filter unit has a filter inlet and a filter outlet. The housing has a first port communicating with the vapour outlet, a second port communicating with the filter inlet, a third port communicating with the filter outlet and a fourth port. The valve is implemented between the first port and the second port, and the valve comprises a closure body moveably arranged in said housing. The closure body is moveable by the actuator and is configured for creating, in the open position of the valve, the passageway with the first size between the first port and the second port, whilst closing the third port and the fourth port, in a first position of the closure body;

for creating in said housing a barrier between a first volume and a second volume in a second position of the closure body, said first volume forming a passage between the first port and the second port, and said second volume forming a passage between the third port and the fourth port; and for closing, in the closed position of the valve, the first port and the second port, in a third position of the closure body;

for creating, in the one or more intermediate positions of the valve, the passageway with the smaller size between the first port and the second port, whilst opening the third port and the fourth port, in a fourth position of the closure body.

In such an embodiment the function of the canister vent valve is combined with the function of the vapour vent valve. More in particular, the inventors have realised that those valves do not need to be closed at the same time, and that it is possible to realise the function of those two valves with a specially adapted module including a closure body which is moveable in at least four positions, including one or more intermediate positions which allow for a refined control of the amount of vapour leaving the vehicle tank. Such an embodiment has the advantage of being compact and requiring fewer components compared to prior art solutions.

In such an embodiment the system may further comprise a detection means configured for detecting a refueling modus in which liquid is added in the vehicle tank; wherein the controller is configured for controlling the actuator to place the closure body in the second or fourth position upon detection of the refueling modus. Also, the system may comprise a purging system configured for purging the vapour filter unit during a purging modus; wherein the controller is configured for controlling the actuator to place the closure body in the third or fourth position upon entering the purging modus. Further, the system may comprise a detection means for detecting a leakage modus or a parking modus of the vehicle; wherein the controller is configured for controlling the actuator to place the closure body in the first position upon detection of the fuel system leak detection modus or the parking modus.

According to another aspect of the invention there is provided a vapour recovery method comprising controlling a vapour flow from a vehicle tank using a valve, said valve being configured for being positionable in a closed position, an open position creating a passageway with a first size, and one or more intermediate positions each creating a passageway with a size which is smaller than said first size. The controlling comprises positioning the valve in a sequence of positions over time, wherein said sequence comprises at least one of said one or more intermediate positions during a time period, said time period being larger than 1 second.

According to a preferred embodiment the controlling of the positioning, and in particular the selecting of the at least one intermediate position and/or the controlling of the begin time of the time period, is performed by an electronic controller based on vehicle status parameters.

According to a preferred embodiment the valve is arranged in a line between a vapour outlet of a vehicle tank and the atmosphere; and the controlling is performed during refueling of the vehicle tank. The controlling may comprise positioning the valve in the open position, next positioning the valve in the at least one intermediate position during a period of the refueling event corresponding with said time period, and thereafter positioning the valve in the closed position. In an exemplary embodiment the method further comprises detecting a level of the liquid in the vehicle tank; and determining a start time of the time period based on the detected level.

In an exemplary embodiment the valve is arranged in a line between a vapour outlet of a vehicle tank and a vapour filter unit, preferably a canister; and the controlling is performed during purging of the vapour filter unit. The method may further comprise measuring or otherwise inferring a vapour load of the vapour filter unit; and determining said at least one intermediate position and/or said time period in function of the measured or otherwise inferred vapour load during purging of the vapour filter unit.

In a preferred embodiment the valve is positionable in a plurality of intermediate positions, and the controlling comprises selecting at least one intermediate position of said plurality of positions and including said at least one selected position in the time sequence. In that way the intermediate positions may be "calibrated" positions. If the actuator is a stepper motor the selection may consist in selecting a number of steps to be set from a reference position, e.g. the closed position.

According to another aspect of the invention there is provided a controller configured to perform any one or more of the controlling steps that have been disclosed in the various embodiments above.

According to an aspect of the invention there is provided a system comprising a proportionally controllable fuel tank isolation valve providing proportionately selectable fluid communication between a fuel tank and a path to the atmosphere, with said path potentially including a carbon canister, and a controller configured to control the proportionally controllable fuel tank isolation valve at the end of refueling characteristics during the refueling of a vehicle, wherein the controller is configured to proportionally control the size of a passageway between the fuel tank and the path to the atmosphere and the time period during which a passageway with a certain size is maintained. Preferably, a stepper driven linear actuator is used to actuate the valve.

According to an embodiment there is provided a method for controlling such a proportionally controllable fuel tank isolation valve, in which said valve is closed based on measurements performed by a fuel level sensor, and immediately reopened to a passageway with a calibratable size controlled by the controller.

According to an aspect of the invention there is provided a method of controlling a valve in which said valve is partially closed to a predetermined and calibratable flow path area based on an output of a fuel level sensor configured for measuring the level of fuel in a vehicle tank. The flow path area may be adjusted in response to a pressure and/or temperature feedback indicating the conditions in or around the fuel tank.

According to an aspect of the invention there is provided a system comprising a proportionally controllable fuel tank isolation valve providing proportionately selectable fluid communication between a fuel tank and a vapour path to a vehicle intake manifold, with said path potentially including in fluid communication a carbon canister and a purge control valve near the engine intake, and a controller configured to control the size and/or timing of the vapour path of said proportionally controllable fuel tank isolation valve in response to commands from the vehicles engine controller. Preferably a stepper driven linear actuator is used to actuate the valve, and the controller controls the actuator.

According to an aspect of the invention there is provided a method of controlling a valve for regulating the vapour flow through the canister during purging of the canister, in which said valve is partially closed to a predetermined and calibratable flow path area based on one or more engine controller outputs related to the purging of the canister. More in particular the valve may be closed in response to an engine controller output being in a first range during purging, and opened to a predetermined and calibratable flow path area in response to an engine controller output being in a second range during purging.

In a preferred embodiment, the vehicle tank is a fuel tank and the filter unit is an evaporation canister. However, it may be envisaged to use the invention in other types of tanks with filter unit where vapour control is required.

In embodiments of the invention the controller is preferably an electronic control unit configured for being connected with at least one active component in the tank, e.g. a level sensor, a temperature sensor, a pressure sensor, hydrocarbon sensor, fuel pump, etc.; and/or with a CAN bus; and/or with a fuel cap position sensor for detecting the position of the fuel cap; and/or with a fuel cap lock solenoid for (de)activating a locking of the fuel cap; and/or with a liquid pressure sensor for measuring the pressure of liquid fuel in a line between the vehicle tank and the engine; and/or HC sensor; and/or canister load sensor; and/or fuel pump; and more generally with any other sensors for measuring vehicle status parameters.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

Figure 1A:
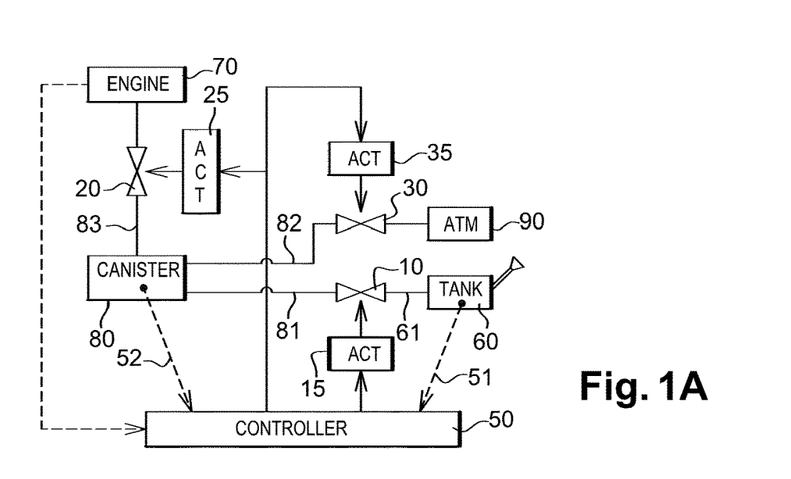
FIG. 1A is a schematic view illustrating a first exemplary embodiment of a vehicle vapour recovery system of the invention.

FIG. 1A illustrates a first embodiment of a fuel vapour recovery system of the invention. The system comprises valves 10, 20, 30, actuators 15, 25, 35 for operating said valves 10, 20, 30 and a controller 50 for controlling the actuators 15, 25, 35. Valve 10 is arranged in a line between the vapour outlet 61 of a vehicle tank 60 and a canister inlet 81 of a canister 80, and valve 20 is arranged between a purge outlet 83 of the canister 80 and the engine 70. Valve 30 is arranged between the vapour outlet 61 of the vehicle tank and the atmosphere 90, and more in particular between a canister outlet 82 and the atmosphere 90. Hence, both valves 10 and 30 are arranged in a line between the vapour outlet 61 and the atmosphere 90.

Figure 1B:
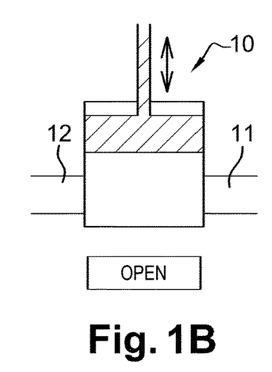
FIGS. 1B, 1C and 1D illustrate different positions of the valve 10 of the embodiment of FIG. 1A.
Figure 1C:
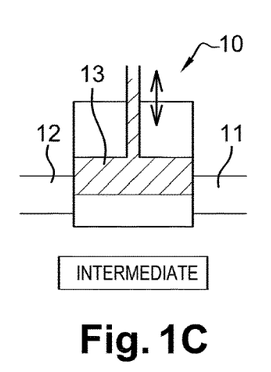
Figure 1D:
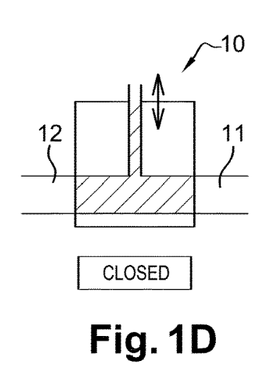

Valve 10 is configured for being positionable in a closed position, an open position creating a passageway with a first size, and one or more intermediate positions each creating a passageway with a size which is smaller than said first size. Those positions are illustrated in FIGS. 1B (open position), 1C (intermediate position) and 1D (closed position). In the intermediate position (FIG. 1C) the valve body 13 of the valve 10 partly obstructs the passage between an inlet 11 and an outlet 12 of the valve 10 creating a passageway with a smaller size compared to the size of the passageway in the open position (FIG. 1B).

The controller 50 is configured for controlling said actuator 15 to position said valve 10 in a sequence of positions over time, wherein said sequence comprises at least one intermediate position of said one or more intermediate positions (FIG. 1C) over a time period, said time period being larger than 1 second, preferably larger than 2 seconds. In other words, instead of controlling the valve to be in a closed or in an open position, the controller can also control the valve to be in an intermediate position, or to move gradually from one intermediate position to a following intermediate position, wherein the total time period in which the valve remains in an intermediate position (i.e. in the same intermediate position or in a sequence of different intermediate positions) is non-negligible, and in particular larger than 1 second.

Preferably, the controller 50 is configured for controlling the actuator 15 to position valve 10 in a sequence of positions during refueling of the vehicle tank in function of one or more vehicle status parameters, such as the filling level in the tank 60. The controller 50 may be configured for controlling the actuator 15 to position the valve 10 in the open position at a begin time of a refueling event; and for controlling the actuator 15 to position the valve 10 in one or more intermediate positions as the refueling continues, and finally in the closed position at an end time of the refueling event. There may be provided a level sensor (not shown) for detecting a level of the fuel in the vehicle tank 60 (schematically represented by dotted line 51), and the controller 50 may be configured for determining that the end time of the refueling event has been reached when the detected level is above a predetermined threshold level. The controller 50 may be configured for determining that the begin time of the refueling event is reached upon detecting any one or more of the following (not shown): an input of a button operable by an operator, opening of a fuel door of the vehicle, shut-off of the vehicle, vehicle in the park position.

Further, the controller 50 may be configured for controlling the actuator 15 to position the valve 10 in a sequence of positions during purging of the vapour filter unit in function of one or more vehicle status parameters, such as the load level of the canister 80 (schematically represented by dotted line 52). There may be provided a measurement means (not shown) for measuring a vapour load of the canister 80, and the controller 50 may be configured for selecting at least one intermediate position in function of the measured vapour load during purging of the canister 80.

Valve 30 with corresponding actuator 35 may also be a proportionally controllable valve, but could also be a normal "closed/open" valve which is either controlled to be in the closed or in the open position.

Figure 2:
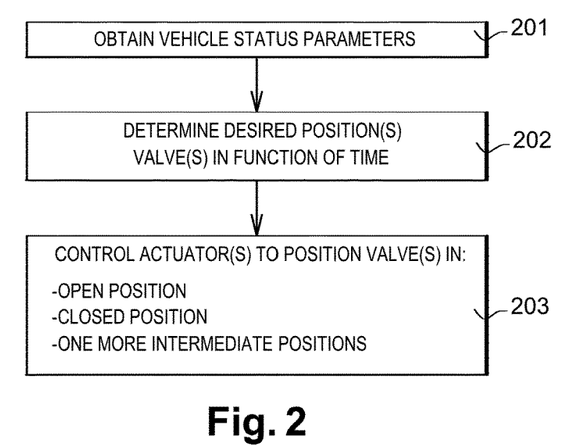
FIG. 2 illustrates a flow chart of an embodiment of the vapour control method of the invention.

FIG. 2 illustrates an embodiment of the method of the invention. The method comprises in a first step 201 obtaining vehicle status parameters. Vehicle status parameters may include any one or more of the following: liquid level in the vehicle tank, temperature in the vehicle tank, pressure in the vehicle tank, hydrocarbon content in the vehicle tank, the position of a fuel cap (closed/open), position of the fuel door (open/closed), pressure of liquid fuel in a line between the vehicle tank and the engine, canister load. In a second step 202 the desired positions in function of time for one or more valves used for vapour recovery is determined, wherein at least one valve of the one or more valves is configured for being positionable in a closed position, an open position creating a passageway with a first size, and one or more intermediate positions each creating a passageway with a size which is smaller than said first size. The at least one valve may be implemented e.g. as described above for valve 10 of FIG. 1. In a third step the vapour flow from a vehicle tank is controlled using the one or more valves, wherein said controlling comprises positioning at least one valve in a sequence of positions over time, wherein said sequence comprises at least one intermediate position of said one or more intermediate positions during a time period (T), said time period (T) being larger than 1 second.

The one or more valves are arranged in a line between a vapour outlet of a vehicle tank and the atmosphere, which line may include an active carbon canister. The controlling may be performed during refueling of the vehicle tank.

The controlling of step 203 may comprise positioning the valve in the open position, next positioning the valve in at least one of the one or more intermediate positions during a period of the refueling event corresponding with said time period, and thereafter positioning the valve in the closed position. In such an embodiment the determining in step 202 may comprise detecting a level of the fuel in the vehicle tank; and determining a start time of the time period based on the detected level.

The valve may be arranged in a line between a vapour outlet of a vehicle tank and a vapour filter unit, preferably a canister; and wherein the controlling of step 203 may be performed during purging of the vapour filter unit. Step 202 may then comprise measuring a vapour load of the vapour filter unit; and determining the at least one intermediate position and/or the length of the time period and/or the begin time of the time period in function of the measured vapour load during purging of the vapour filter unit.

Figure 3A:
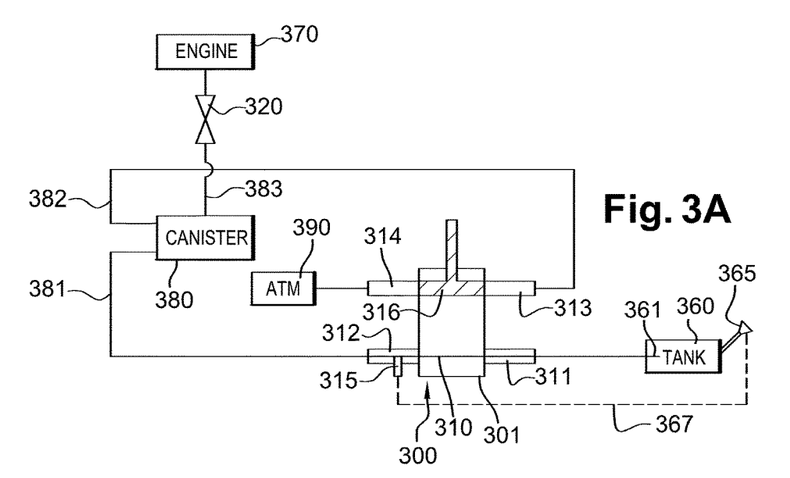
FIG. 3A is a schematic view illustrating a second exemplary embodiment of a vehicle vapour recovery system of the invention.
Figure 3B:
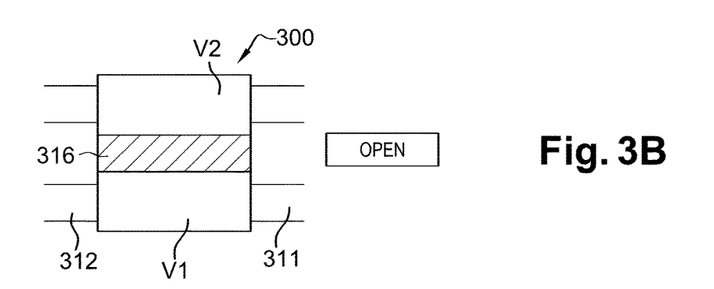
FIGS. 3B, 3C and 3D illustrate different positions of the valve 310 of the embodiment of FIG. 3A.
Figure 3C:
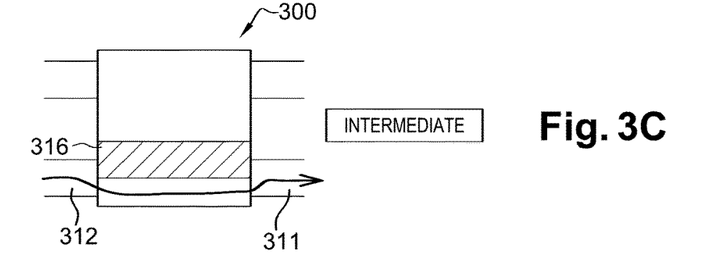
Figure 3D:
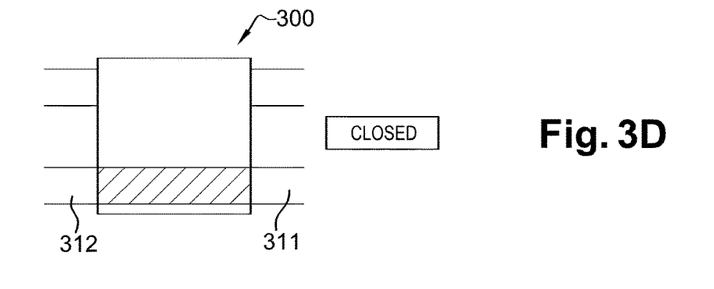

FIG. 3A illustrates a second embodiment of a fuel vapour recovery system according to the invention. The system comprises a vehicle tank 360, a filter unit in the form of a canister 380, and a valve module 300. In FIGS. 3B, 3C and 3D only the module 300 is shown. The vehicle tank 360 has a vapour outlet 361 connected to a first port 311 of the module 300. The canister 380 has a canister inlet 381, a canister outlet 382, and a purge line outlet 383 leading to the engine 370. The module 300 comprises a housing 301 having a first port 311, a second port 312, a third port 313, and a fourth port 314. The second port 312 communicates with the canister inlet 381. The third port 313 communicates with the canister outlet 382. The fourth port 314 is in communication with the atmosphere 390. A closure body 316 is movably arranged in the housing 301. The closure body 316 is moved by an actuator (not shown). A controller (not shown) is used to control the actuator in order to move the closure body 316 in a desirable position.

The proportionally controllable valve 310 is implemented between the first port 311 and the second port 312. The closure body 316 can be positioned in a first position corresponding with an open position of valve 310 (FIG. 3A), in a second position corresponding with an open position of valve 310 (FIG. 3B), a third position corresponding with a closed position of valve 310 (FIG. 3D), and a fourth position corresponding with an intermediate position of valve 310 (FIG. 3C).

In the first position illustrated in FIG. 3A, the closure body 316 closes the third port 313 and the fourth port 314. In the first position, the fuel tank 360 communicates with the inlet 381 of the canister 380, while the communication between the outlet 382 and the atmosphere 390 is blocked. This first position is typically used when the vehicle is in the parking position or during leak detection for OBD requirements.

In the second position of the closure body 316, a barrier is created between a first volume V1 and a second volume V2. The first volume V1 defines a passage between the first port 311 and the second port 312, and the second volume V2 defines a passage between the third port 313 and the fourth port 314. Typically, the closure body 316 is put in this second position at the beginning of a depressurizing or refueling event. When refueling, the fuel vapours run from the tank through the canister 380 into the atmosphere 390. Further fuel vapours present in the filler pipe 365 of the tank can also escape through the canister 380 into the atmosphere 390 via a recirculation line 367 which is connected to the line between second port 312 and the canister inlet 381, see the dotted lines in FIG. 3A. There could be provided a fifth port 315 for the recirculation line 367. The fifth port 315 communicates with the second port 312 irrespective of the position of the closure body 316.

In the third position of the closure body 316, see FIG. 3D, the first port 311 and the second port 312 are closed, while the third port 313 and the fourth port 314 are open and can communicate with each other. In this third position, the tank 360 is fully sealed and there is no communication between the tank 360 and the canister 380. Only the recirculation line 367 can communicate with the canister 380. In the third position, the outlet 382 of the canister 380 communicates with the atmosphere 390. The closure body 316 may be placed in the third position e.g. at the end of refueling, or when purging the canister 380. When purging, air is drawn into the outlet 382 of the canister 380, through the canister medium, and through a canister purge valve 320 allowing the fuel vapour stored in the canister 380 to be delivered to the engine 370.

In the fourth position of the closure body 316, see FIG. 3C, the first port 311 and the second port 312 are partially closed, while the third port 313 and the fourth port 314 are open and can communicate with each other. This corresponds with an intermediate position of the valve 310 in which the passageway created between the first port 311 and the second port 312 has a smaller size than in the position of FIG. 3B.

The valve module 300 is schematically shown in FIG. 3A but may be any one of the valve modules disclosed in patent application WO2014207083 in the name of the Applicant, with this difference that the actuator and controller should be such that the closure body can be positioned in one or more intermediate positions. More in particular the closure body may be rotatable instead of translatable, the closure body may be a membrane, etc. The closure body 313 may be composed of one single part or may be composed of multiple parts. If multiple parts are used, those parts are preferably moved synchronously. Alternatively, those multiple parts may be connected to each other. Also, the valve module 300 may be integrated in the canister 380. Further the controller may be provided in the module 300.

The skilled person understands that the actuator of valve 310, i.e. the actuator moving closure body 313, may be controlled during refueling and/or during purging in a manner similar to what has been described above for the first embodiment of FIG. 1A.

Typical components that may be provided in the tank 360 are a fuel delivery module (FDM), as well as a number of active components. The active components may comprise a vapour pressure sensor, a temperature sensor, a fuel system compile unit (FSCU)—fuel pump, and a level gauge. The controller may be connected with the different active components in the tank 360. The tank is provided with a filler pipe 365 closed by a fuel cap. There may be provided an inlet check valve at the connection between the tank 360 and the filler pipe 365, which will block the communication between the filler pipe 365 and the tank body 360 when the tank is full. Further, there may be provided a fuel cap position sensor and a fuel door lock solenoid, which communicate with the controller. Liquid fuel in the tank 360 can leave the tank through a line. Typically, there is provided a liquid pressure sensor measuring the liquid pressure in this line, at a location near the engine 370. This liquid pressure sensor can also communicate with the controller. The controller may be connected with a CAN bus for communicating with the other electronic devices in the vehicle. Control signals received from any of the active components can be used in the OBD strategy.

Figure 4:
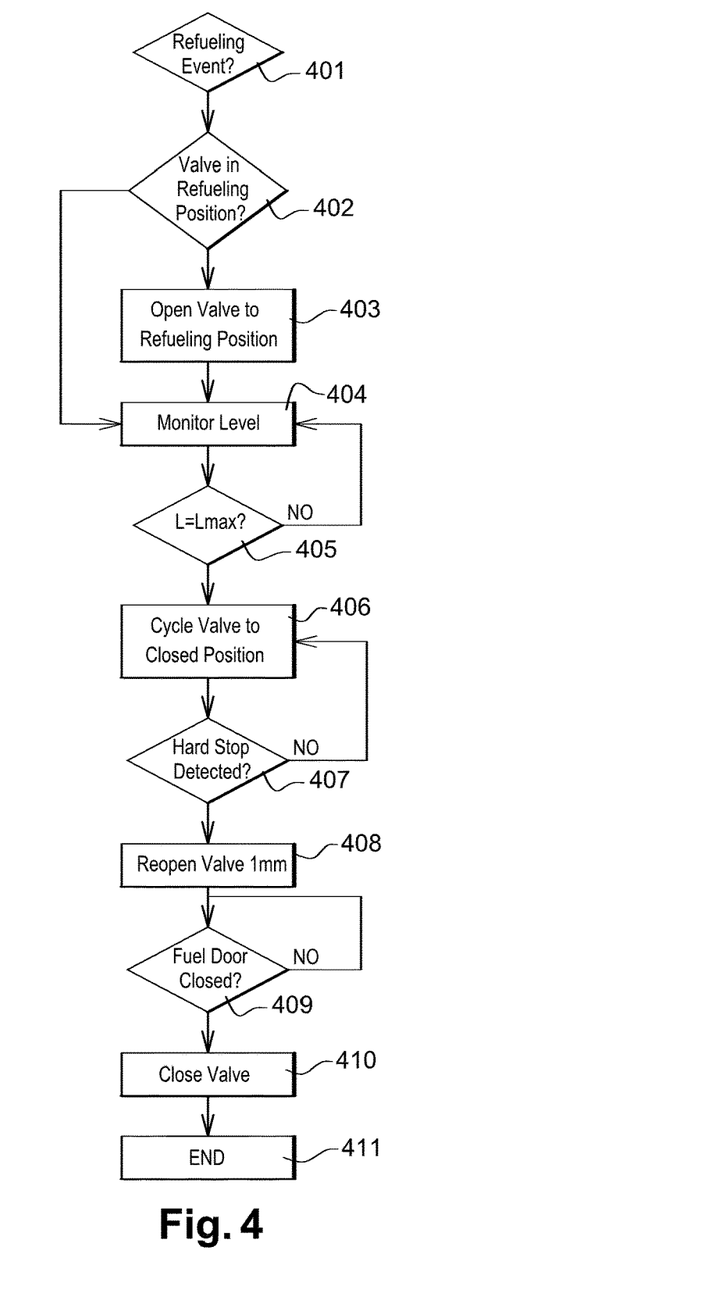
FIG. 4 illustrates a flow chart of an exemplary embodiment of the method of the invention for use during refueling.

FIG. 4 depicts an embodiment of a vapour control method of use during refueling. In FIG. 4 controller queries the vehicle as to whether there is a refueling event, see steps 401 and 402. This query can be performed by any number of ways including but not limited to an input from the operator of the vehicle via a button, the opening of the fuel door, shut-off of the vehicle, or vehicle in park position. In addition a pressure sensor reading could be used to verify that the fuel system is at a safe pressure level to refuel the tank. Once said query produces a positive result a valve in a line connected to a vapour outlet of the vehicle tank is opened, see step 403, in order to allow vapours to flow to the canister in order to maintain a pressure conductive safe refueling. During this refueling event the controller monitors the level of the fuel in the tank, see step 404. When the level L reaches a maximum threshold Lmax, see step 405, the valve is cycled to a closed position, see steps 406 and 407, to form a datum, and then cycled back the equivalent amount of steps to position the valve in an intermediate position (e.g. reopen valve over 1 mm) such that a controlled end of refueling that respects the customer requirements is obtained, see step 408. The maximum threshold Lmax may be calibrated during the refueling process.

Steps 406-408 may be replaced by a single partial closing operation, especially if the actuator, and hence the position of the valve can be controlled in a very reliable manner. In this case an alternate step would be to go from the open position directly to a partially closed intermediate position, see also FIG. 6A which is discussed below.

The method of FIG. 4 further comprises after step 408, a step 409 where it is determined if the fuel door has been closed. If the fuel door has been closed, the valve is put in the closed position, see step 410, whereupon the refueling event is finished, see step 411.

Figure 5:
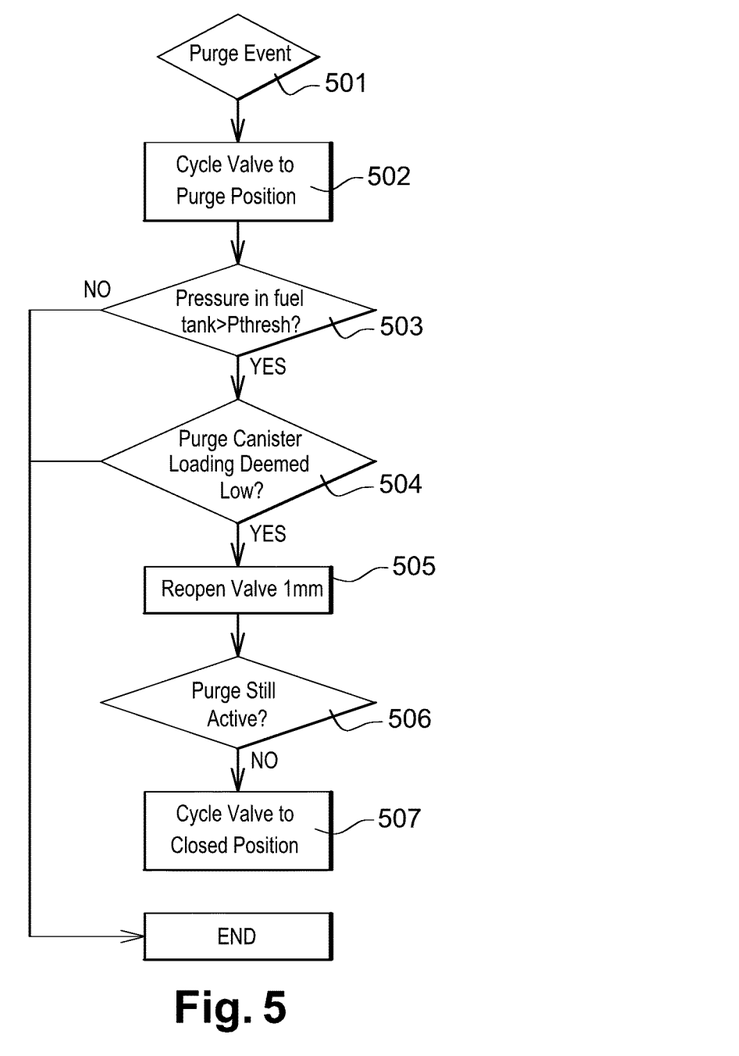
FIG. 5 illustrates a flow chart of an exemplary embodiment of the method of the invention for use during purging.

FIG. 5 depicts a further embodiment of a vapour control method for use during purging. In FIG. 5 a controller queries a vehicle as to whether a purge event is to occur, see step 501. Subsequently the valve is cycled to a purge position, i.e. a closed position, see step 502, isolating the fuel tank from the canister in order to avoid drawing vapours from the tank during said purge event. However, if predetermined criteria with respect to certain vehicle status parameters are met, including but not limited to the pressure in the tank, see step 503, and the inferred loading of the carbon canister, see step 504, the controller may control the actuator to put the valve in a partially reopened intermediate position, see step 505 in order to allow an amount of vapour to be taken out of the tank. The requirement with respect to the pressure may be that the pressure in the tank is higher than a predetermined threshold pressure Pthresh. The requirement with respect to the canister loading may be that the loading is below a predetermined value. In other words, when the pressure in the tank is relatively high and the loading is relatively low, the valve may be partially opened. Once the purge event is finished, see step 506, the valve may reclose, see step 507, and the cycle is complete. In other embodiments the valve may remain open at the end of a purge event.

Figure 6:
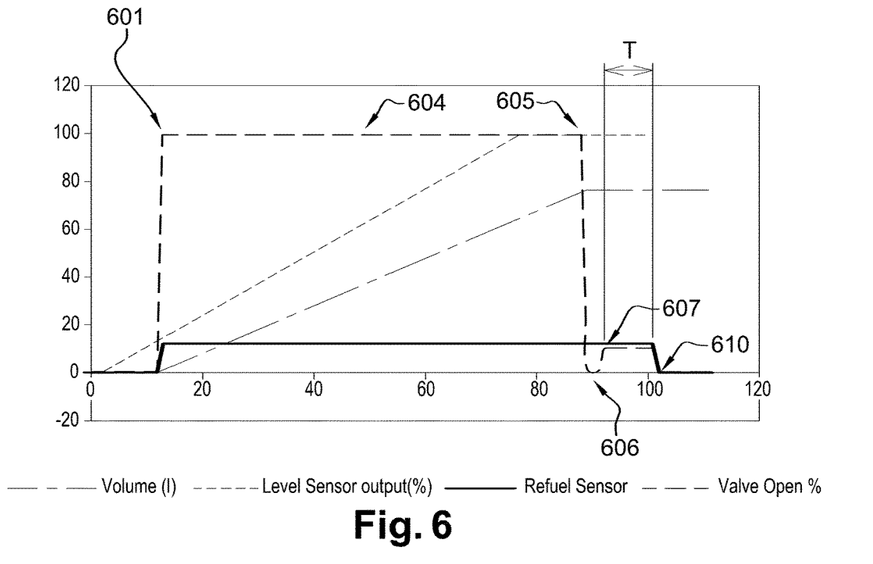
FIG. 6 is a chart illustrating an example of a sequence of valve positions in function of time during a refueling event.

FIG. 6 depicts in a timeline of the events of the embodiment of the method of FIG. 4. In a first step 601 a refueling sensor detects that a refueling event has been initiated and the refueling valve is opened to 100% of its opening capacity. After opening of the valve, see 604, the level in that tank is monitored, see the "level sensor output" curve showing that the level gradually increases with time. In a later instance 605 the controller determines via the level sensed by the level sensor, optionally using a predefined time constant defining a delay between the reaching of a certain level and the moment that the valve should be closed, that the fuel level has reached maximum capacity. At that time the valve is forced to close, see 606, and partially reopened (intermediate position), see 607. The valve stays in an intermediate position for a time period T which is larger than 1 second, preferably larger than 2 seconds. In other words, in this embodiment the begin time of the time period T is determined based on the level sensor output. Further, the valve open percentage (in the shown example about 10%) may be determined during calibration and/or may be further adjusted by the controller in function of one or more vehicle status parameters.

Figure 6A:
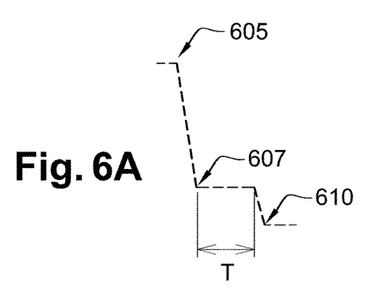
FIGS. 6A and 6B illustrate two variants of the exemplary sequence illustrated in FIG. 6.

According to an alternative embodiment the valve may be positioned directly in the intermediate position without being first closed, see FIG. 6A. At a later point in time, see 610, when a signal for refueling reflects the end of a refueling event and/or a predetermined time after a full signal from the level sensor has elapsed, the valve is moved again to the closed position. Also in this embodiment the begin time of the time period T may be determined based on the level sensor output. Further, the valve open percentage may be determined during calibration and/or may be further adjusted by the controller in function of one or more vehicle status parameters.

Figure 6B:
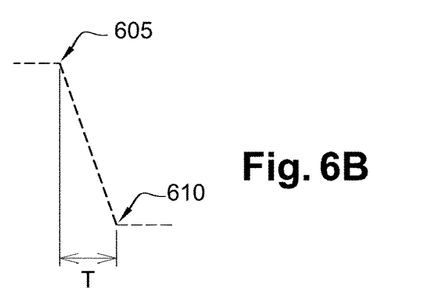

According to yet another alternative the valve may be gradually closed, so that it is in a series of intermediate positions during a time period T which is larger than 1 second, before the valve is closed entirely, see FIG. 6B. In this embodiment the begin time of the time period T may be determined based on the level sensor output. Further, the slope of the "vale open %" curve may be determined during calibration and/or may be further adjusted by the controller in function of one or more vehicle status parameters.

Figure 7:
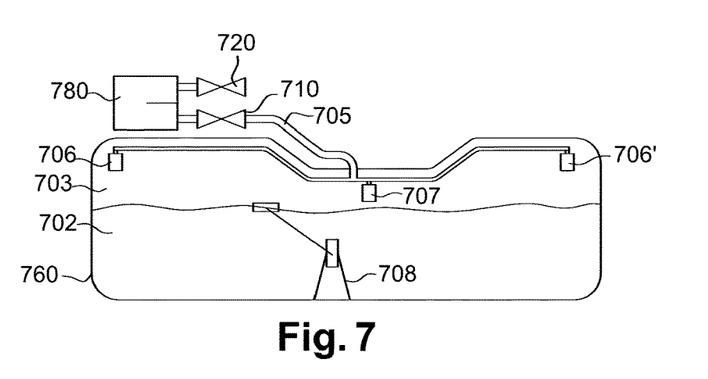
FIG. 7 is a schematic view illustrating another exemplary embodiment of a vehicle vapour recovery system of the invention.

FIG. 7 depicts a typical vapour recovery system comprising a vehicle tank 760 for holding liquid fuel 702 and including a predefined vapour space 703, a carbon canister 780 for capturing the vapours from the vapour space 703, a venting line 705 fluidly connecting the vapour space 703 to the canister 780, liquid discriminating valves 706, 706', 707 for allowing vapour passage but not fluid, and a level sensor 708. A valve 710 and/or a valve 720 are arranged in the venting line 705 in order to control the flow of vapours between the vapour space 703 and the carbon canister 780. As in the embodiment of FIG. 1 the valves 710 and/or the valve 720 may be a proportional valve that can be positioned by an actuator in an open, a closed, and one or more intermediate positions. The actuator may be controlled by a controller according to any one of the embodiments of the method described above.

Figure 8:
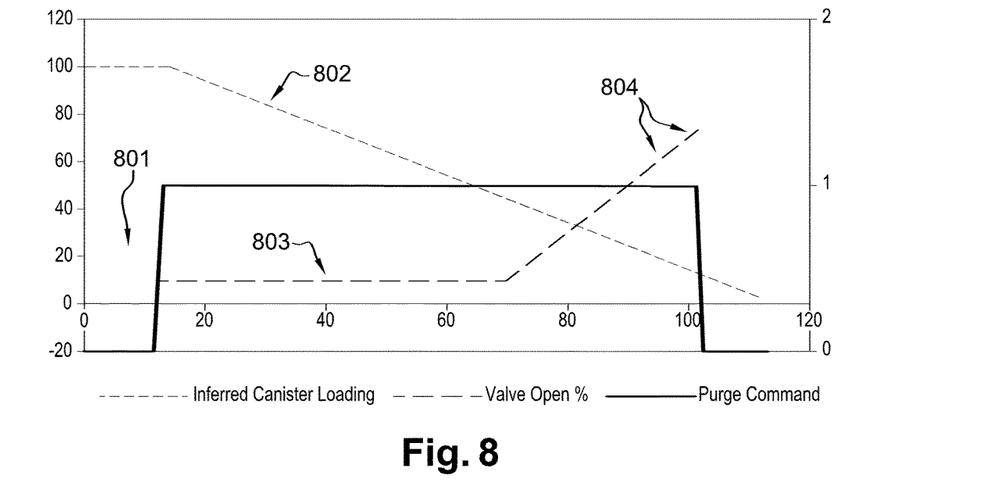
FIG. 8 is a chart illustrating an example of a sequence of valve positions in function of time during a purging event.

FIG. 8 depicts an embodiment of a vapour control method for use during purging, wherein the inferred canister loading, the purge command, the position of the valve (valve open %) are illustrated on a timeline. The following steps occur. In a first step 801 the vehicle initiates a purge event assuming 100% loading. In a next step 802, the vehicle begins to meter in the purge into the engine and determine the canister loading via the air fuel ratio change, see the "inferred canister loading curve" of FIG. 8. As long as the determined canister loading is above a predefined threshold, the valve is kept in an intermediate only partially opened position, see 803, or in a closed position (not illustrated), depending on the strategy. As the canister is emptied over time and the loading drops below the predefined threshold, the valve may be further opened, see 804, to allow more removal of vapour from the tank. The person skilled in the art will realize that also other vehicle status parameters, such as the pressure in the tank, the temperature, etc. may be used to determine a suitable sequence of intermediate positions for the valve.

Figure 9:
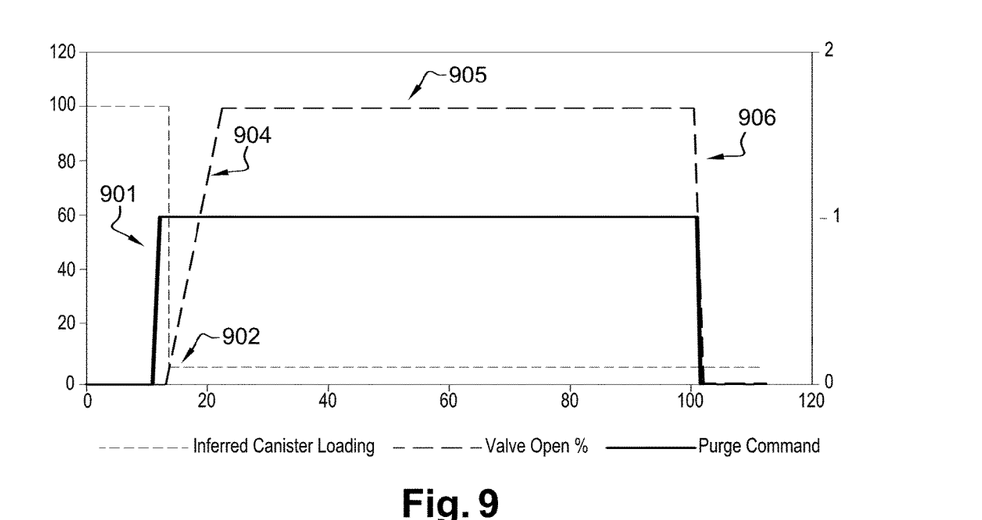
FIG. 9 is a chart illustrating an example of a sequence of valve positions in function of time during a purging event.

FIG. 9 depicts another embodiment of a vapour control method for use during purging, wherein the inferred canister loading, the purge command, the position of the valve (valve open %) are illustrated on a timeline. The same steps occur as in the embodiment of FIG. 8, but it is assumed that the canister loading is already low at the beginning of the purge event. In a first step 901 the vehicle initiates a purge event assuming 100% loading. In a next step 902, the vehicle begins to meter in the purge into the engine and determine the canister loading via the air fuel ratio change, see the "inferred canister loading curve" of FIG. 9. In this example it is determined that the canister loading is below a predefined threshold, see 902, and the controller controls the actuator of the valve to open the valve entirely, see 905, to allow more removal of vapour from the tank. This opening may take place gradually, see 904, passing through a number of intermediate positions of the valve. The person skilled in the art will realize that also other vehicle status parameters, such as the pressure in the tank, the temperature, etc. may be used to determine a suitable sequence of intermediate positions for the valve. After a predetermined time the controller closes the valve, see 906, and ends the purge cycle. According to an alternative embodiment the valve may remain open at the end of the purge cycle.

Whilst the principles of the invention have been set out above in connection with specific embodiments, it is to be understood that this description is merely made by way of example and not as a limitation of the scope of protection which is determined by the appended claims.

The invention claimed is:

1. A vapour recovery system for recovering vapour coming from a vehicle tank comprising:
 a valve configured for being positionable in a closed position, an open position creating a passageway with a first size, and one or more intermediate positions each creating a passageway with a size which is smaller than said first size;
 an actuator configured for operating said valve;
 an electronic controller configured for controlling said actuator to position said valve in a sequence of positions over time, wherein said sequence comprises at least one of said one or more intermediate positions during a time period, said time period being larger than 1 second;
 wherein the valve is arranged in a line of the vapour recovery system between a vapour outlet of the vehicle tank and the atmosphere;
 wherein the actuator is a stepper-motor based linear actuator;
 wherein the controlling comprises selecting at least one intermediate position of said one or more intermediate positions, the selection consisting in selecting a number of steps to be set from a predetermined reference position; and
 wherein the controller is configured to:
  in response to a positive detection of a refuelling event, position the valve in the open position;
  monitor a level of liquid in the vehicle tank and, in response to the level reaching a predetermined threshold level, position the valve in the closed position; and
  then reopen the valve by positioning the valve in an intermediate position.

2. The vapour recovery system of claim 1, wherein the valve is configured to be positioned in a plurality of intermediate positions, and the controller is configured to select at least one intermediate position of said plurality of intermediate positions in function of at least one vehicle status parameter, and to include said selected at least one intermediate position in said sequence during the time period.

3. The vapour recovery system of claim 1, wherein, after the reopening of the valve, the controller is further configured for detecting a fuel door closing event and for positioning the valve in the closed position.

4. The vapour recovery system of claim 1, wherein the controller is configured for controlling the actuator to position said valve in the sequence of positions during refuelling of the vehicle tank.

5. The vapour recovery system of claim 4, wherein the sequence of positions comprises the open position during a first period of a refuelling event, the at least one intermediate position during a second period corresponding with said time period, and at the end of the refuelling event the closed position.

6. The vapour recovery system of claim 5, further comprising a level sensor for detecting the level of the liquid in the vehicle tank; wherein the controller is configured for determining the at least one intermediate position and/or a begin time of the second period based on the detected level.

7. The vapour recovery system of claim 1, wherein the valve is arranged in a line between the vapour outlet of the vehicle tank and a vapour filter unit.

8. The vapour recovery system of claim 7, wherein the vapour filter unit is a canister.

9. The vapour recovery system of claim 7, wherein the controller is configured for controlling the actuator to position the valve in the sequence of positions during purging of the vapour filter unit.

10. The vapour recovery system of claim 7, further comprising a determination means for determining a vapour load of the filter unit; wherein the controller is configured for determining said at least one intermediate position and/or the time period and/or a begin time of the time period in function of the determined vapour load during purging of the vapour filter unit.

11. The vapour recovery system of claim 1, further comprising:
 a vapour filter unit having a filter inlet and a filter outlet; and
 a housing having a first port communicating with the vapour outlet, a second port communicating with the filter inlet, a third port communicating with the filter outlet and a fourth port; wherein the valve is implemented between the first port and the second port, and the valve comprises a closure body moveably arranged in said housing; wherein said closure body is moveable by the actuator and is configured
  for creating, in the open position of the valve, the passageway with the first size between the first port and the second port, whilst closing the third port and the fourth port, in a first position of the closure body;
  for creating in said housing a barrier between a first volume and a second volume in a second position of the closure body, said first volume forming a passage between the first port and the second port, and said second volume forming a passage between the third port and the fourth port;
  for closing, in the closed position of the valve, the first port and the second port, in a third position of the closure body; and
  for creating, in the one or more intermediate positions of the valve, a passageway with a smaller size between the first port and the second port, while opening the third port and the fourth port, in a fourth position of the closure body.

12. The vapour recovery system of claim 1, wherein, after the valve is reopened by positioning the valve in the intermediate position, the controller is configured to close the valve at an end of the refuelling event.

13. A vapour control method comprising:
 controlling a vapour flow from a vehicle tank using a valve, said valve being configured for being positionable in a closed position, an open position creating a passageway with a first size, and one or more intermediate positions each creating a passageway with a size which is smaller than said first size;
 wherein said controlling comprises positioning the valve in a sequence of positions over time, including
  positioning the valve in the open position in response to a positive detection of a refuelling event;
  positioning the valve in the closed position in response to a level of liquid in the vehicle tank reaching a predetermined threshold level; and
  after positioning the valve in the closed position, reopening the valve by positioning the valve in an intermediate position,
 wherein said valve is positioned in the intermediate position for a time period larger than 1 second, and
 wherein said controlling comprises selecting at least one intermediate position of said one or more intermediate positions, the selection consisting in selecting a number of steps to be set from a predetermined reference position by a stepper-motor based linear actuator.

14. The method of claim 13, wherein the controlling of the positioning is performed by an electronic controller based on vehicle status parameters.

15. The method of claim 13, further comprising detecting the level of the liquid in the vehicle tank; and determining a start time of the time period based on the detected level.

16. The method of claim 13, wherein the valve is arranged in a line between a vapour outlet of the vehicle tank and a vapour filter unit; and wherein the controlling of the positioning is performed during purging of the vapour filter unit.

17. The method of claim 16, further comprising measuring a vapour load of the vapour filter unit; and determining said at least one of said one or more intermediate positions and/or a length of said time period and/or a begin time of said time period, in function of the measured vapour load during purging of the vapour filter unit.

18. The method of claim 16, wherein the vapour filter unit is a canister.

19. The method of claim 13, wherein, after the valve is reopened by positioning the valve in the intermediate position, the valve is closed at an end of the refuelling event.

* * * * *